United States Patent
Hirooka

(10) Patent No.: US 7,187,523 B2
(45) Date of Patent: Mar. 6, 2007

(54) METHOD OF MARKING SINTERED BODY AND METHOD FOR MANUFACTURING MAGNETIC HEAD WAFER

(75) Inventor: Taisuke Hirooka, Kobe (JP)

(73) Assignee: Neomax Co., Ltd., Osaka (JP)

( * ) Notice: Subject to any disclaimer, the term of this patent is extended or adjusted under 35 U.S.C. 154(b) by 204 days.

(21) Appl. No.: 10/979,910

(22) Filed: Nov. 2, 2004

(65) Prior Publication Data

US 2005/0109729 A1    May 26, 2005

Related U.S. Application Data

(62) Division of application No. 10/444,133, filed on May 23, 2003, now Pat. No. 6,906,895.

(30) Foreign Application Priority Data

Sep. 20, 2002  (JP) .............................. 2002-274976

(51) Int. Cl.
 *G11B 5/147*  (2006.01)
 *G01L 21/30*  (2006.01)
(52) U.S. Cl. ........................ 360/234.3; 216/60; 216/76
(58) Field of Classification Search ............. 360/234.3, 360/235.1, 235.3; 29/603.12, 603.15; 216/22, 216/60, 76, 59, 66, 74, 75, 77, 79, 72; 204/192.32, 204/192.33, 192.34, 192.35, 192.37
See application file for complete search history.

(56) References Cited

U.S. PATENT DOCUMENTS 5,516,430 A    5/1996  Hussinger
5,764,454 A    6/1998  Hishida
5,837,963 A   11/1998  Kitahara
6,202,289 B1   3/2001  Yoshimura et al.
6,449,123 B1   9/2002  Tsujimoto et al.
6,532,132 B2 *  3/2003  Tsujimoto et al. .......... 360/126
6,906,895 B2 *  6/2005  Hirooka ................... 360/234.3
7,114,239 B2 * 10/2006  Hirooka ................... 29/603.12

FOREIGN PATENT DOCUMENTS

| JP | 09050606 A * | 2/1997 |
| JP | 9-081922 | 3/1997 |
| JP | 10-134317 | 5/1998 |
| JP | 11-126311 | 5/1999 |

\* cited by examiner

Primary Examiner—William J Klimowicz
(74) Attorney, Agent, or Firm—Keating & Bennett, LLP

(57) ABSTRACT

A method of marking a sintered body includes the step of preparing the sintered body by sintering a mixture of first and second types of powder particles. The first type of powder particles is made of a first material and the second type of powder particles is made of a second material that has a different etch susceptibility from the first material. The method further includes the step of writing ID information on the surface of the sintered body by forming a first concave region to a depth of at least about 10 nm under the surface of the sintered body and a second concave region under the first concave region, respectively. The first concave region is formed by etching away both the first and second types of powder particles, while the second concave region is formed by etching away only the first type of powder particles.

11 Claims, 8 Drawing Sheets

US 7,187,523 B2

METHOD OF MARKING SINTERED BODY AND METHOD FOR MANUFACTURING MAGNETIC HEAD WAFER

This application is a Divisional of U.S. patent application Ser. No. 10/444,133 filed May 23, 2003, now U.S. Pat. No. 6,906,895.

BACKGROUND OF THE INVENTION

1. Field of the Invention

The present invention relates to a method of marking a sintered body with ID information and more particularly, relates to a method of marking a sintered body with ID information having high contrast while minimizing contamination. The present invention also relates to a method for manufacturing a wafer for magnetic heads including performing a marking process and further relates to a sintered body that has been marked with ID information, a magnetic head, and a storage medium drive.

2. Description of the Related Art

Recently, a thin-film magnetic head having any of various structures often includes a magnetic head slider for use in a hard disk drive (HDD), a tape storage and a flexible (or floppy) disk drive (FDD), for example. Examples of wafers for such a thin-film magnetic head include sintered wafers having compositions such as $Al_2O_3$—TiC, SiC and $ZrO_2$.

FIG. 1A illustrates a typical thin-film magnetic head slider 10. On its tracking side, this magnetic head slider 10 includes two side rails 11 that are arranged to be opposed to the surface of a magnetic disk. The surface of the thin-film magnetic head slider 10 on which the side rails 11 are provided is sometimes called an "air bearing surface (ABS)". If the magnetic disk is rotated at a high velocity by a motor, for example, while the surface of the magnetic disk is pressed lightly by the side rails 11 of the magnetic head slider 10 by way of a head suspension, then an air layer will be formed on the surface of the magnetic disk and will reach the back surface of the air bearing surface of the slider 10. As a result, the magnetic head slider 10 is slightly lifted up. In this manner, the magnetic head slider 10 can perform read and write operations on the magnetic disk while "flying" near the surface of the disk so to speak.

A thin film 12, which causes a magnetic interaction with a storage medium such as a magnetic disk, is deposited on one end surface of the magnetic head slider 10. The thin film 12 is used to form part of an electrical/magnetic transducer. To indicate the type of the product, an identifier (ID or ID mark) 13 such as a serial number is inscribed on the other end surface of the magnetic head slider 10. Methods of inscribing an identifier 13 on sintered wafers are disclosed in Japanese Laid-Open Publications Nos. 9-81922, 10-134317 and 11-126311, for example.

In a typical manufacturing process, the magnetic head slider 10 is obtained by cutting out a bar 20 shown in FIG. 1B from a sintered wafer 1 shown in FIG. 1C and then dicing the bar 20 into a great number of chips. In FIG. 1C, the end surface 4 of the sintered wafer 1 is parallel to the air bearing surface of the magnetic head slider 10 shown in FIG. 1A.

Recently, as the sizes of such a thin-film magnetic head have been decreased to reduce the sizes and weight of an electronic appliance, the thickness of the sintered wafer 1 (corresponding to the length L of the magnetic head slider 10) and the thickness T of each bar 20 (corresponding to the height of the magnetic head slider 10) have also been reduced. For example, a magnetic head slider, which is called a "pico-slider", has a length L of about 1.2 mm and a thickness T of about 0.3 mm. As for a magnetic head slider of such drastically reduced sizes, the sizes of characters to be inscribed on the slider should also be reduced correspondingly.

In the prior art, a laser marking method is often used to inscribe the identifier 13 (this process step will be sometimes referred to herein as a "marking" process step or an "ID marking" process step). In the laser marking method, the identifiers 13 shown in FIGS. 1A and 1B are marked on the back surface 3 of the wafer 1 that is yet to be divided into the bars 20. After the marking process step is finished, various thin films 12 are stacked on the front surface 2 of the wafer 1.

Hereinafter, the conventional laser marking method will be described briefly with reference to FIG. 2.

In the laser marking method, the back surface 3 of the sintered wafer 1 is locally irradiated with a laser beam 6 that has been converged by a lens 5, thereby rapidly heating and vaporizing the irradiated portion of the wafer 1. In this case, a tiny concave portion is formed on the back surface 3 of the wafer 1, while the material of the sintered wafer 1 is scattered around and just a portion of the scattered material is deposited on the wafer 1 again. By scanning the back surface 3 of the wafer 1 with the laser beam 6, the concave portions can be arranged so as to form an arbitrary pattern on the back surface 3 (which will be referred to herein as a "concave pattern"). Any of various types of identifiers 13 can be written at an arbitrary location on the wafer 1 by forming a concave pattern, which is made up of alphanumeric and/or numeric characters or a barcode, on the back surface 3 of the wafer 1.

A laser marking method as described above, however, has the following drawbacks.

Firstly, the portion of the sintered material that has been scattered around as a result of the exposure to the laser beam is likely adsorbed or deposited as dust onto the inscribed characters, thus causing a contamination problem in many cases.

Secondly, the edges of the inscribed characters are often burred through the exposure to the laser beam. Thus, a deburring processing step needs to be carried out.

FIG. 3 schematically illustrates a cross section of a sintered wafer 1 on which characters have been marked by the conventional laser marking method. This cross-sectional view is drawn after a scanning electron microscope (SEM) photograph has actually been taken. As shown in FIG. 3, a deep concave portion 30 is formed on the surface of the wafer 1 as a result of the laser beam exposure. As measured from the back surface of the wafer 1 in the direction indicated by the arrow a in FIG. 3, the concave portion 30 has a depth of about 30 µm to about 50 µm. A convex portion (or burr) 31 is also formed around the edge of the concave portion. As also measured from the back surface of the wafer 1 in the direction indicated by the arrow b, the burr 31 has a height of several µm. The concave portion may have a width of about 20 µm, for example.

As shown in FIG. 3, a huge number of particles 32 are deposited on the inner surface of the deep concave portion 30 that has been formed as a result of the laser beam exposure. Strictly speaking, some of those "particles" 32 may have such irregular shapes that cannot be classified among "particles". However, those irregular ones will also be referred to herein as "particles", for the sake of simplicity. To remove those particles 32 from the wafer 1, a cleaning process such as an ultrasonic cleaning process must be carried out for a long time after the marking process is finished. Even so, it has still been difficult to remove most of the particles 32 that have reached the depth of the concave portion 30.

If a huge number of particles 32 are created during the marking process, some of those particles may be dispersed in the cleaning liquid and then deposited on the other side (i.e., the front surface 2) of the wafer 1 that has not been exposed to the laser beam. In that case, when an insulating thin film of amorphous aluminum oxide, for example, is deposited on the front surface 2 of the wafer 1 with the re-deposited particles 32, then those particles 32 might be introduced into the insulating film. Also, the surface of such an insulating thin film is normally planarized before a magnetic thin film is deposited thereon. Accordingly, if the insulating thin film includes the particles 32, portions of the insulating thin film may peel off locally along with the particles 32 to possibly create pinholes in the insulating thin film during the planarizing process. Also, even if no such pinholes have been created, a portion of the insulating thin film may have its thickness decreased significantly by the particles 32. Then, that portion of the insulating thin film may exhibit decreased insulating properties. Furthermore, even when no such particles enter the insulating film, the marked portion of the back surface of the wafer 1 may still be a dust source. Then, the yield may decrease in a number of subsequent manufacturing process steps, and the quality of the final product itself may deteriorate.

Accordingly, to increase the production yield of thin-film magnetic heads, the insulating film to be deposited on the sintered wafer 1 preferably is as high quality as possible. For that purpose, the conditions for the marking process are preferably controlled so as to eliminate the dust or contamination problem. In addition, once completed as a product, the magnetic head needs to be used in a clean environment. Thus, the presence of any dust would also be a problem that affects normal operation of the magnetic head.

Meanwhile, methods of writing ID information on a sintered wafer by a chemical etching process have also been proposed as replacements for the laser marking process. For example, the applicant of the present application disclosed a technique of forming a shallow concave portion by a chemical etching process while increasing the contrast in Japanese Laid-Open Publication No. 2001-334753. According to this technique, a compound sintered body, made of at least two types of powder particles with mutually different etch susceptibilities, is subjected to a selective etching process such that one of the two types of powder particles is etched preferentially. As a result of such a selective etching process, an unevenness of a very small size, corresponding to the size of the powder particles, is formed on the surface of the compound sintered wafer. Such an unevenness decreases the reflectivity of the wafer surface, thereby creating a difference in contrast between the etched and non-etched portions of the wafer.

The selective etching process disclosed in Japanese Laid-Open Publication No. 2001-334753 can resolve the dust or contamination problem. However, according to this technique, the contrast of the reflected light is not high enough to increase the recognition rate of the ID information sufficiently.

SUMMARY OF THE INVENTION

In order to overcome the problems described above, preferred embodiments of the present invention provide a method of marking a sintered body by an etching process with the recognition rate of ID information being significantly increased, and also provide methods of making quality sintered bodies, magnetic head wafers, magnetic heads and storage medium drives with very high yields by performing the marking process step of the marking method of the present invention.

According to a preferred embodiment of the present invention, a method of marking a sintered body includes the step of preparing a sintered body by sintering a mixture of a first type of powder particles and a second type of powder particles. In this case, when the first type of powder particles is made of a first material, the second type of powder particles is preferably made of a second material that has a different etch susceptibility from the first material. The method preferably further includes the step of writing ID information on the surface of the sintered body by defining a first concave region to a depth of at least about 10 nm under the surface of the sintered body and a second concave region under the first concave region, respectively. In this process step, the first concave region is preferably defined by etching away both the first and second types of powder particles, while the second concave region is preferably defined by selectively etching away only the first type of powder particles.

In one preferred embodiment of the present invention, the step of writing the ID information preferably includes the step of defining the second concave region to a depth of at least about 50 nm under the bottom of the first concave region.

In another preferred embodiment, the step of writing the ID information preferably includes the steps of performing a selective etching process such that the first type of powder particles are etched at a higher rate than the second type of powder particles, and performing a non-selective etching process such that the first and second types of powder particles are etched at substantially equal rates after the selective etching process has been carried out.

In this particular preferred embodiment, the step of writing the ID information preferably includes the step of performing the selective etching process and/or the non-selective etching process multiple times.

Specifically, the step of writing the ID information preferably includes the step of performing the non-selective etching process at least as the last etching process thereof.

In another preferred embodiment, the selective etching process and the non-selective etching process are preferably carried out by the same etching system with etching conditions being changed.

In still another preferred embodiment, the first and second types of powder particles may both have a mean particle size of about 0.3 $\mu$m to about 5.0 $\mu$m.

In yet another preferred embodiment, the first concave region preferably has a line width of about 1 $\mu$m to about 20 $\mu$m.

In yet another preferred embodiment, a variation $\Delta R$ in reflectance due to the selective etching process is preferably at least about 25% with respect to light having a particular wavelength. The variation $\Delta R$ is determined by $(R2-R1)/R2$, where $R1$ is the reflectance of a portion of the surface of the sintered body that has been subjected to the selective etching process and $R2$ is the reflectance of another portion of the surface of the sintered body that has not been subjected to the selective etching process.

In this particular preferred embodiment, the particular wavelength is preferably included in the wavelength range of light to be radiated toward the sintered body to read the ID information optically.

In yet another preferred embodiment, a portion of the surface of the sintered body, which has not been subjected to the selective etching process, preferably has a surface roughness of at most about 5 nm.

In yet another preferred embodiment, the depth of the second concave region is preferably about 50 nm to about 5 μm as measured from the bottom of the first concave region.

In yet another preferred embodiment, the first and second materials are preferably compounds selected from the group consisting of aluminum oxide, aluminum nitride, silicon oxide, silicon nitride, zirconium oxide, zirconium nitride, silicon carbide, titanium carbide, titanium oxide and iron oxide.

According to another preferred embodiment of the present invention, a method for manufacturing a wafer for magnetic heads includes the step of preparing a sintered body by sintering a mixture of a first type of powder particles and a second type of powder particles. In this case, when the first type of powder particles is made of a first material, the second type of powder particles is preferably made of a second material that has a different etch susceptibility from the first material. The method preferably further includes the step of writing ID information on the surface of the sintered body by defining a first concave region to a depth of at least about 10 nm under the surface of the sintered body and a second concave region under the first concave region, respectively. The first concave region is preferably defined by etching away both the first and second types of powder particles, while the second concave region is preferably defined by selectively etching away only the first type of powder particles.

According to a further preferred embodiment of the present invention, a sintered body is preferably obtained by sintering a mixture of a first type of powder particles and a second type of powder particles. When the first type of powder particles is made of a first material, the second type of powder particles is preferably made of a second material that has different etch susceptibility from the first material. In this sintered body, a first concave region is preferably defined to a depth of at least about 10 nm under the surface of the sintered body and a second concave region is preferably defined under the first concave region, respectively, thereby writing ID information on the surface of the sintered body. The first concave region is preferably defined by etching away both the first and second types of powder particles, while the second concave region is preferably defined by selectively etching away only the first type of powder particles.

In one preferred embodiment of the present invention, the second concave region preferably has a depth of at least about 50 nm as measured from the bottom of the first concave region.

In this particular preferred embodiment, the second concave region preferably has a depth of at most about 5 μm as measured from the bottom of the first concave region.

In another preferred embodiment, the first and second types of powder particles may both have a mean particle size of about 0.3 μm to about 5.0 μm.

In still another preferred embodiment, a variation ΔR in reflectance due to an etching process is at least about 25% with respect to light having a particular wavelength, the variation ΔR being determined by (R2−R1)/R2, where R1 is the reflectance of a portion of the surface of the sintered body that has been subjected to the etching process and R2 is the reflectance of another portion of the surface of the sintered body that has not been subjected to the etching process.

In this particular preferred embodiment, the particular wavelength is preferably included in the wavelength range of light to be radiated toward the sintered body to read the ID information optically.

In yet another preferred embodiment, a portion of the surface of the sintered body, which has not been subjected to the etching process, preferably has a surface roughness of at most about 5 nm.

In yet another preferred embodiment, the first and second materials are preferably compounds selected from the group consisting of aluminum oxide, aluminum nitride, silicon oxide, silicon nitride, zirconium oxide, zirconium nitride, silicon carbide, titanium carbide, titanium oxide and iron oxide.

Yet another preferred embodiment of the present invention provides a wafer for magnetic heads. The wafer preferably includes a sintered body and an insulating film provided on the sintered body. The sintered body is preferably obtained by sintering a mixture of a first type of powder particles and a second type of powder particles. When the first type of powder particles is made of a first material, the second type of powder particles is preferably made of a second material that has different etch susceptibility from the first material. In the sintered body, a first concave region is preferably defined to a depth of at least about 10 nm under the surface of the sintered body and a second concave region is preferably defined under the first concave region, respectively, thereby writing ID information on the surface of the sintered body. The first concave region is preferably defined by etching away both the first and second types of powder particles, while the second concave region is preferably defined by selectively etching away only the first type of powder particles.

According to yet another preferred embodiment of the present invention, a magnetic head preferably includes a substrate and an electrical/magnetic transducer provided on the substrate. The substrate is preferably made of a mixture of a first type of powder particles and a second type of powder particles. When the first type of powder particles is made of a first material, the second type of powder particles is preferably made of a second material that has a different etch susceptibility from the first material. In the substrate, a first concave region is preferably defined to a depth of at least about 10 nm under the surface of the substrate and a second concave region is preferably defined under the first concave region, respectively, thereby writing ID information on the surface of the substrate. The first concave region is preferably defined by etching away both the first and second types of powder particles, while the second concave region is preferably defined by selectively etching away only the first type of powder particles.

According to yet another preferred embodiment of the present invention, a storage medium drive preferably includes a magnetic head, which includes a substrate and an electrical/magnetic transducer provided on the substrate, a storage medium with a magnetic recording film from/on which information is read or written by the magnetic head, and a motor to drive the storage medium. In the magnetic head, the substrate is preferably made of a mixture of a first type of powder particles and a second type of powder particles. When the first type of powder particles is made of a first material, the second type of powder particles is preferably made of a second material that has a different etch susceptibility from the first material. In the substrate, a first concave region is preferably defined to a depth of at least about 10 nm under the surface of the substrate and a second concave region is preferably defined under the first concave region, respectively, thereby writing ID information on the surface of the substrate. The first concave region is preferably defined by etching away both the first and second types of powder particles, while the second concave region is preferably defined by selectively etching away only the first type of powder particles.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

First, it will be described with reference to FIGS. 4A through 4C how the cross-sectional shape of a concave portion, formed by an etching process, may change with the specific method of the etching process.

Figure 4A:
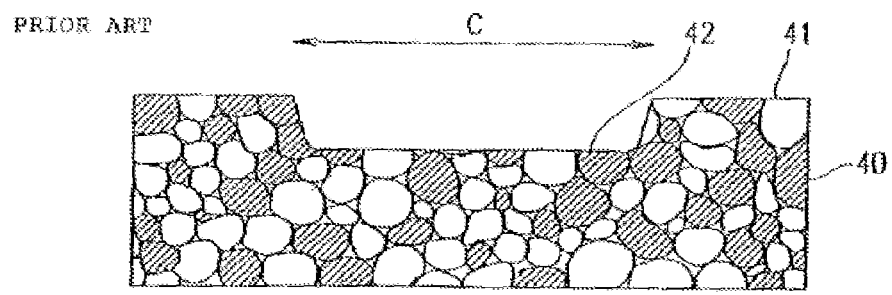
FIG. 4A is a cross-sectional view of an inscribed portion defined by a conventional marking process including a non-selective etching process.

FIG. 4A illustrates a cross section of a concave portion defined by a conventional non-selective etching process. Specifically, FIG. 4A illustrates a cross section of a sintered wafer 40, which is made up of two types of powder particles with mutually different etch susceptibilities. In FIGS. 4A, 4B and 4C, the width of an etched portion on the surface of the sintered wafer 40 (i.e., the width of an inscribed groove) is identified by C. The bottom 42 of the etched portion will be referred to herein as an "etched surface". The etched surface 42 of the wafer 40 is located below the non-etched surface 41 of the wafer 40 and there are steep slopes between the non-etched surface 41 and the etched surface 42.

In the conventional non-selective etching (i.e., physical etching) process, even when the sintered wafer 40 is made up of two types of powder particles having mutually different etch susceptibilities, those two types of powder particles are etched away at substantially equal rates. Thus, a concave portion with a substantially flat bottom 42 is defined on the surface of the sintered wafer 40 as shown in FIG. 4A. As a result of such a non-selective etching process, there will be no substantive difference between the reflectance of the flat surface (i.e., the non-etched surface) 41 of the sintered wafer 40 and that of the flat bottom (i.e., the etched surface) 42 of the concave portion thereof. In that case, even if the concave portion has a depth exceeding about 10 μm, it is difficult to achieve a desired contrast that is high enough to make the ID information recognizable at a sufficiently high read rate.

Such a non-selective etching technique is often adopted in the prior art to define a deep concave portion efficiently enough (i.e., at a sufficiently high etch rate). In other words, a deep concave portion cannot be defined at an increased etch rate unless the non-selective etching technique is adopted.

Figure 4B:
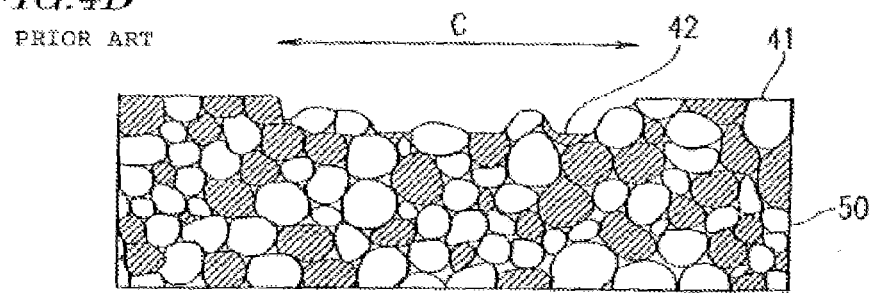
FIG. 4B is a cross-sectional view of an inscribed portion defined by a marking process including a selective etching process.

FIG. 4B shows a cross section of a concave portion defined by the method that was disclosed by the applicant of the present application in Japanese Laid-Open Publication No. 2001-334753. In the example illustrated in FIG. 4B, a selective etching process is carried out under conditions that allows the two types of powder particles of the sintered wafer 50 to exhibit mutually different etch susceptibilities. As a result, one of the two types of powder particles (i.e., the hatched particles) with the higher etch susceptibility is etched earlier and faster than the other type of powder particles (i.e., the non-hatched particles) with the lower etch susceptibility. As a result, an unevenness of very small size is defined on the etched surface 42. In that unevenness, the width of the depressed portions is approximately equal to the size of the hatched particles and the depth thereof is changeable with the amount of time in which the etching process is carried out.

In a ceramic sintered wafer, which is now used extensively for magnetic heads, particles thereof typically have a mean particle size of about 0.3 μm to about 5.0 μm, which is much smaller than the width C (e.g., about 1 μm to about 20 μm) of the concave portion defined by the marking process. Thus, the bottom of the concave portion defined by the etching process (i.e., the etched surface 42) diffuses or scatters the light that has been radiated from an ID information reader. That is to say, the reflectance of the etched surface 42 becomes lower than that of the flat surface (i.e., the non-etched surface) 41. In this manner, a difference is created between the reflectances of the etched and non-etched surfaces 42 and 41 of the sintered wafer 50. As a result, even if the concave portion has a relatively shallow depth (or etch depth), the reflected light still achieves a sufficiently high contrast. However, the reflectance of the surface of the sintered wafer also depends on the wavelength or the spectrum of the light radiated. Accordingly, a sufficient difference (which is preferably at least about 25%) in reflectance needs to be produced for the light to be actually used by the optical ID information reader.

However, if the concave portion has a shallow depth as in the example illustrated in FIG. 4B, then the boundary between the etched and non-etched portions (i.e., the border lines of a character or a numeral representing the ID information) would be indefinite, thus possibly causing read errors (or recognition errors). In particular, if the raised portions on the etched surface 42 have their height decreased as a result of a polishing process to be performed on the surface of the wafer after the wafer has been marked with the ID information, then the reflectance would decrease and those read errors would increase. Also, if the inscribed groove has a narrow width C, there will be a decreased number of depressed and raised portions on the bottom of the groove. In that case, the reflectance itself drops and the read errors may further increase.

To overcome these problems, according to a preferred embodiment of the present invention, first, a "selective etching process" is carried out to selectively etch away one of two types of powder particles with mutually different etch susceptibilities at a higher rate, and then a "non-selective etching process" is carried out to etch away both of those two types of powder particles at almost equal rates. In this manner, a first concave region is defined on the surface of a sintered body by etching away both of the two types of powder particles and a second concave region is defined under the first concave region by selectively etching away one of the two types of powder particles.

Figure 4C:
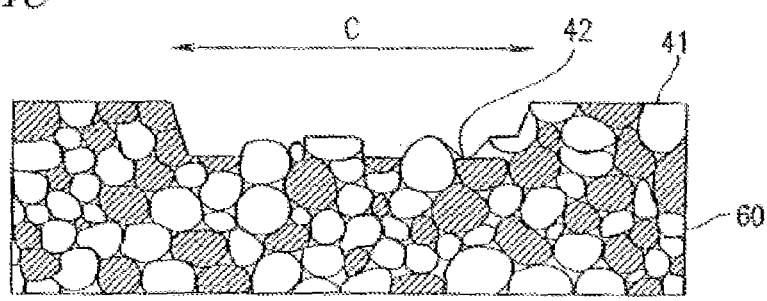
FIG. 4C is a cross-sectional view of an inscribed portion defined by a marking process in which the selective etching process and the non-selective etching process are carried out in this order.
Figure 5:
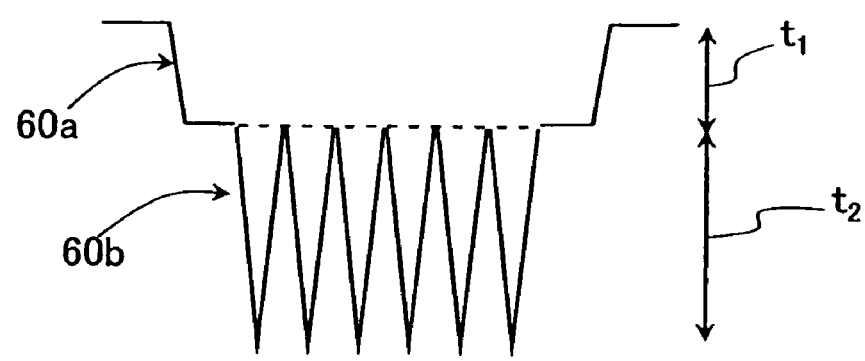
FIG. 5 is a cross-sectional view schematically illustrating an inscribed portion according to a preferred embodiment of the present invention.

FIG. 4C illustrates a cross section of an inscribed groove defined by such a two-step etching process. As shown in FIG. 4C, this inscribed groove has a cross-sectional shape to be obtained by combining the inscribed groove shown in FIG. 4A with the inscribed groove shown in FIG. 4B so to speak. This cross-sectional structure Will be described in further detail with reference to FIG. 5. FIG. 5 is a cross-sectional view schematically illustrating the profile of the inscribed groove shown in FIG. 4C. In FIG. 5, the first concave region, defined by etching away both of the two types of powder particles alike, is identified by the reference numeral 60a while the second concave region, defined by etching away just one of the two types of powder particles selectively, is identified by the reference numeral 60b.

For example, in an AlTiC wafer made of a mixture of $Al_2O_3$ particles and TiC particles, the process step of selectively etching away the TiC particles and the process step of etching away both of the $Al_2O_3$ and TiC particles at almost equal rates may be carried out back to back, thereby defining a structure such as that shown in FIG. 5. In that case, the depth t1 of the first concave region 60a is the etch depth of the non-selective etching process (i.e., the etch rate of the non-selective etching process×time) while the depth t2 of the second concave region 60b is the etch depth of the selective etching process (i.e., the etch rate of the selective etching process×time). In this example, the TiC particles are etched in both of the selective and non-selective etching processes. Accordingly, in the overall etching process, the etch rate of the TiC particles is defined by dividing the total depth of the inscribed groove (i.e., t1+t2) by the total etch time. It should be noted that the shape shown in FIG. 5 may also be obtained even by performing the non-selective etching process first and then the selective etching process.

The depth t1 of the first concave region 60a is measured with respect to the non-etched surface of the wafer, while the depth t2 of the second concave region 60b is measured with respect to the bottom of the first concave region 60a. These depths may be measured with an atomic force microscope (AFM).

The present inventors discovered and confirmed via experiments that the reflectance of the etched surface changed with the depth t2 of the second concave region 60b but did not depend on the depth t1 of the first concave region 60a. On the other hand, the depth of field of the optical character recognition does change with the depth t1 of the first concave region 60a. In a preferred embodiment of the present invention, the first concave region 60a preferably has a depth t1 of about 10 nm or more to increase the recognition rate. To further increase the recognition rate, the first concave region 60a preferably has a depth t1 of at least about 20 nm, more preferably at least about 25 nm. The upper limit of the depth t1 is not particularly limited because the first concave region 60a sometimes has a depth t1 that does not make the character unrecognizable even when the back surface of the wafer is processed by a subsequent process step. However, the deeper the first concave region 60a (i.e., the greater the depth t1), the longer the time it takes to finish the non-selective etching process. Thus, the first concave region 60a preferably has a depth t1 of at most about 5 μm.

The present inventors also discovered via experiments that when such an AlTiC wafer was used, a difference in reflectance of at least about 25% could be obtained by setting the depth t2 of the second concave region 60b at about 50 nm or more, and that the difference in reflectance increased with the depth t2. Specifically, the results of the experiments revealed that the second concave region 60b preferably has a depth t2 of at least about 100 nm, more preferably at least about 150 nm. The upper limit of the depth t2 of the second concave region 60b is not particularly limited, either. However, considering the time it takes to finish the selective etching process, the depth t2 may be at most about 5 μm, for example.

Hereinafter, specific preferred embodiments of the present invention will be described with reference to the accompanying drawings.

Method of Marking Sintered Body

First, a sintered wafer is prepared by a known method.

In a preferred embodiment of the present invention, the sintered wafer to be marked with ID information is obtained by mixing two types of powder particles that should be etched at mutually different rates under a particular combination of etching conditions. A ceramic made up of at least two compounds selected from the group consisting of aluminum oxide, aluminum nitride, silicon oxide, silicon nitride, zirconium oxide, zirconium nitride, silicon carbide, titanium carbide, titanium oxide and iron oxide can be used effectively as such a material for the sintered wafer.

One of the important features of preferred embodiments of the present invention is that the powder particles for use to make the sintered wafer exhibit at least two different etch susceptibilities. For example, even when two compounds have the same composition that is commonly represented by the identical chemical formula $Al_2O_3$, those two compounds may exhibit significantly different etch susceptibilities depending on whether or not impurities such as rare earth oxides or alkaline earth oxides are added thereto and also depending on the specific concentrations of the impurities. Stated otherwise, it is also possible to intentionally impart mutually different etch susceptibilities to first and second powders that have the same basic composition of $Al_2O_3$. Thus, a marking method according to a preferred embodiment of the present invention can also be carried out on a sintered wafer that is made up of at least two types of $Al_2O_3$ powders with mutually different etch susceptibilities.

Hereinafter, a specific example of a preferred embodiment of the present invention will be described with reference to FIGS. 6A through 6D. In the example illustrated in FIGS. 6A through 6D, the sintered wafer 60 is a composite wafer made of an $Al_2O_3$—TiC ceramic, i.e., consisting of two types of materials of $Al_2O_3$ and TiC.

Figure 6A:
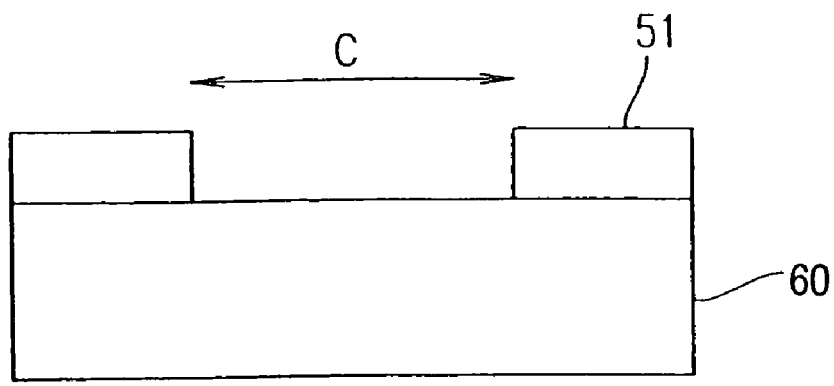
FIGS. 6A, 6B and 6C are cross-sectional views showing respective process steps of the selective etching process to be performed for marking purposes.

First, as shown in FIG. 6A, before the sintered wafer 60 is subjected to an etching process for marking purposes, the surface of the sintered wafer 60 is masked except for its portions to be etched away. Specifically, the surface of the sintered wafer 60 is covered with a masking layer 51 with sufficient etch resistivity. When the masking layer 51 is made of a positive photoresist, for example, the positive photoresist may be applied to a thickness of about 1 μm to about 2 μm on the surface of the sintered wafer 60 with a spinner, for example, and then baked. As such a photoresist material, OFPR-800 produced by Tokyo Ohka Kogyo may be used, for example.

Next, after the photoresist has been baked, the photoresist is exposed to a g-line ray at an intensity of about 200 mJ/cm$^2$ by way of a photomask or a "Titler" marker that defines an ID information pattern. This process step will be referred to herein as an "exposure process step".

When the exposure process step is finished, a development process step is carried out, thereby obtaining a resist mask 51, having an opening (with a width C) that defines a pattern corresponding to the ID information pattern, on the sintered wafer 60.

Subsequently, the sintered wafer 60 covered with the resist mask 51 is loaded into an etching process chamber (not shown) of a reactive ion etching (RIE) system, thereby subjecting the wafer 60 to a predetermined etching process. The etching gases for use in this etching process may be appropriately selected according to the specific material to be etched. In this preferred embodiment, the $Al_2O_3$—TiC ceramic wafer is used as described above. Thus, $CF_4$ gas or $SF_6$ gas is preferably used, for example. When $CF_4$ gas is used, the electrical discharge of the $CF_4$ gas generates radical species and ions. In the reaction chamber of the RIE system, the following chemical reactions are produced:

Fundamental reaction process:

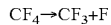
$$CF_4 \rightarrow CF_3 + F$$

Inverse reaction process:

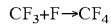
$$CF_3 + F \rightarrow CF_4$$

$$2F \rightarrow F_2$$

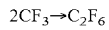
$$2CF_3 \rightarrow C_2F_6$$

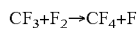
$$CF_3 + F_2 \rightarrow CF_4 + F$$

As a result of these reactions, $CF_3$ and F are generated as radical species. An etching process to which F contributes has a selectivity so as to etch TiC earlier and faster than $Al_2O_3$. In this preferred embodiment, the selective etching process is preferably carried out under such conditions that the etch rate of TiC becomes several times as high as the etch rate of $Al_2O_3$.

On the other hand, a physical etching process, to which ions generated by the electrical discharge contribute, has no such selectivity, thus etching $Al_2O_3$ and TiC at almost equal rates. It should be noted that the etch rate of $Al_2O_3$ may be slightly higher than that of TiC depending on the conditions.

In this manner, in the RIE system, the ion-induced physical etching action competes with the radical-species-induced chemical etching action. Thus, by controlling the gas pressure and the voltage applied to the electrode, the RIE system can readily switch the selective etching process and the non-selective etching process. Specifically, when the gas pressure is set relatively high and the voltage relatively low, the radical species density exceeds the ion density, thus accelerating the selective etching process. Conversely, when the gas pressure is set relatively low and the voltage relatively high, the ion density exceeds the radical species density, thus accelerating the non-selective etching process.

As used herein, the "selective etching process" means an etching process in which the etch rate A of one type of material (i.e., particles) to be chemically etched relatively quickly relative to the etch rate B of the other type of material (i.e., particles) to be chemically etched relatively slowly is at least about 3. That is to say, the selective etching process satisfies $3 \leq A/B$. On the other hand, the "non-selective etching process" is carried out under such conditions as to satisfy $0.7 \leq A/B \leq 1.3$. Accordingly, an intermediate etching process that satisfies $1.3 < A/B < 3$ is neither selective nor non-selective.

If the gas pressure and the pressure inside the RIE system are defined at intermediate values, then the etching action produced will be halfway between the selective etching action and the non-selective etching action. A cross-sectional structure such as that shown in FIG. 5 may also be formed even by such an intermediate etching process. However, the electrical discharge producing such an etching action is too unstable to control the etch rate as intended. Also, such an unstable etching action likely causes the etch residue problem (to be described later). For these reasons, the intermediate etching process, satisfying $1.3 < A/B < 3$, is not preferred.

Thus, in this preferred embodiment of the present invention, the selective and non-selective etching processes are sequentially carried out by switching the etching conditions appropriately such that the cross-sectional structure shown in FIG. 5 is formed constantly.

It should be noted that the selective etching process does not have to performed just once but may be repeated a number of times. The same statement is true of the non-selective etching process. Also, the selective and non-selective etching processes may be carried in an arbitrary order. Nevertheless, the non-selective etching process is preferably carried out as the last etching process. This is because the etch residue to be left on the wafer by the selective etching process in many cases is preferably decomposed and cleaned off the wafer by the ion-induced non-selective etching process.

Figure 6B:
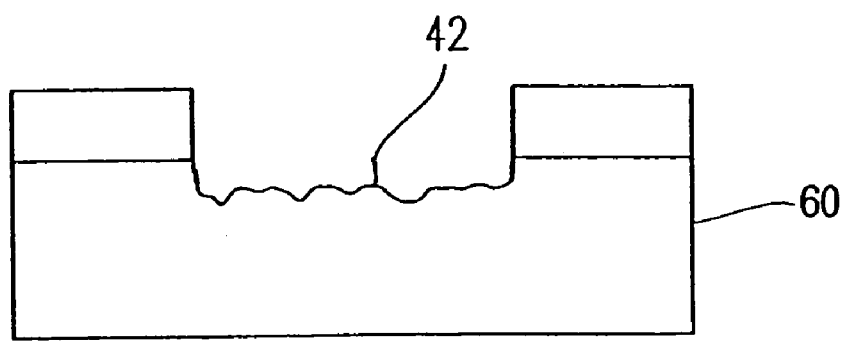

When the etching process is finished, the exposed portion of the sintered wafer 60 (i.e., the etched surface 42), which is not covered with the resist mask 51, has unevenness of a very small size on the bottom of the concave portion that is deeper than the non-etched surface as shown in FIG. 6B.

Figure 6C:
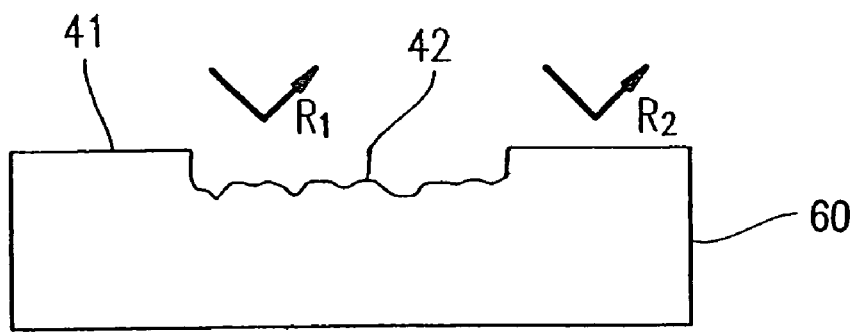
Figure 6D:
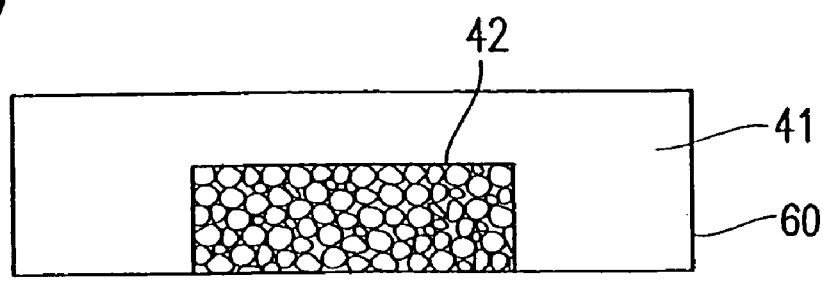
FIG. 6D is a plan view schematically illustrating the etched surface and non-etched surface of a ceramic wafer.

Next, as shown in FIG. 6C, the resist mask 51 is removed from the sintered wafer 60. The etched surface 42 with the unevenness of the very small size has a reflectance R1, which is lower than the reflectance R2 of the relatively flat non-etched surface 41 (i.e., R1<R2). FIG. 6D is a plan view schematically illustrating the unevenness of the etched surface 42.

The layout of the etched surface is defined by the planar pattern of the resist mask 51. The planar pattern of the resist mask 51, in turn, is arbitrarily defined by a photomask or a "Titler" marker for use in an exposure process. Thus, any desired ID information such as characters, signs or barcodes may be written on the sintered wafer 60.

To decrease the reflectance R1 of the etched surface 42, the line width of the characters, signs or barcodes is preferably sufficiently greater than the mean particle size of the particles that make up the sintered wafer 60.

On the other hand, to increase the reflectance R2 of the non-etched surface 41, the non-etched surface 42 preferably has a decreased surface roughness so as to be planarized. For that purpose, it is effective to polish the surface of the sintered wafer 60 before subjecting the wafer 60 to the etching process described above.

The greater the variation $\Delta R=((R2-R1)/R2)$ in reflectance due to the etching process, the higher the contrast achieved by the light that has been radiated toward the surface of the sintered wafer 60. In the example illustrated in FIG. 6D, the etched surface 42 looks darker than the other portions, thereby making the ID information such as inscribed letters recognizable accurately.

According to the preferred embodiment of the present invention described above, a structure such as that shown in FIG. 5 is defined to increase not only the contrast by utilizing the fine unevenness on the bottom of a groove with an appropriate depth but also the profile of the inscribed groove. As a result, the ID information can be recognized at an increased rate.

Method for Manufacturing Magnetic Head Wafer

Hereinafter, a preferred embodiment of a method for manufacturing a wafer for magnetic heads according to the present invention will be described.

First, an $Al_2O_3$—TiC based ceramic wafer, for example, is prepared. On the back surface of such a composite wafer (i.e., opposite to the front surface thereof on which magnetic thin films are stacked), ID information is marked by the marking process described above.

Thereafter, an amorphous aluminum oxide film is deposited to a thickness of about 0.5 μm to about 20 μm on the front surface of the wafer by a sputtering process, for example. Subsequently, the surface of the amorphous aluminum oxide film is planarized to complete the preparatory stage of the process for manufacturing a thin-film magnetic head wafer.

Figure 1A:
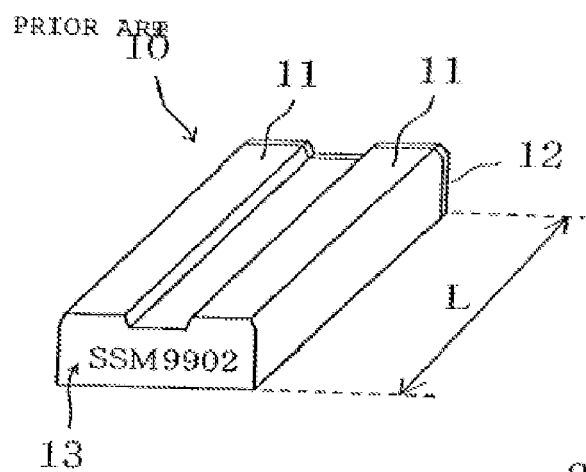
FIG. 1A is a perspective view of a slider for a magnetic head.
Figure 1B:
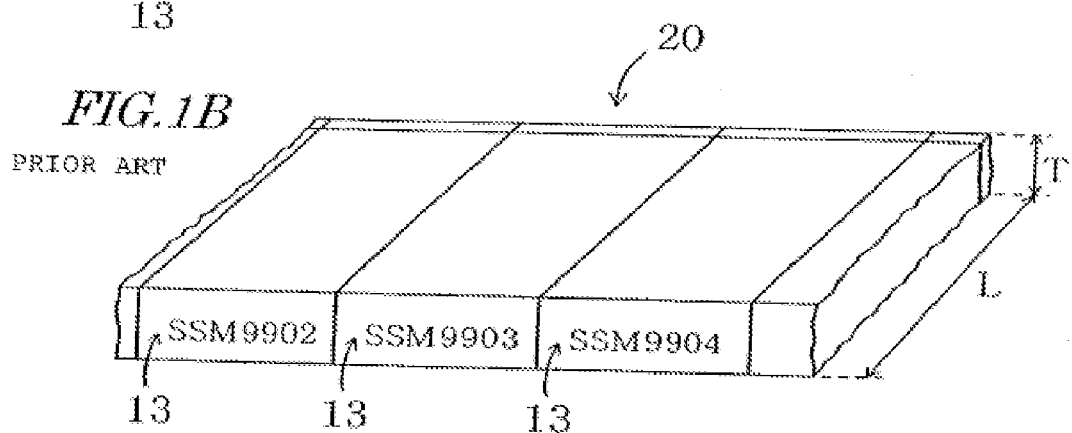
FIG. 1B is a perspective view illustrating a bar yet to be divided into multiple sliders for a magnetic head.
Figure 1C:
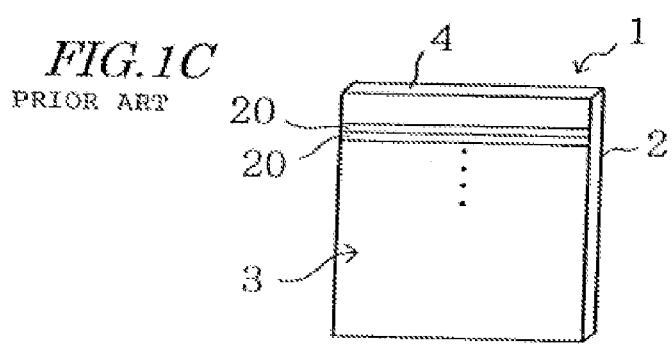
FIG. 1C is a perspective view illustrating a substantially rectangular sintered wafer.
Figure 2:
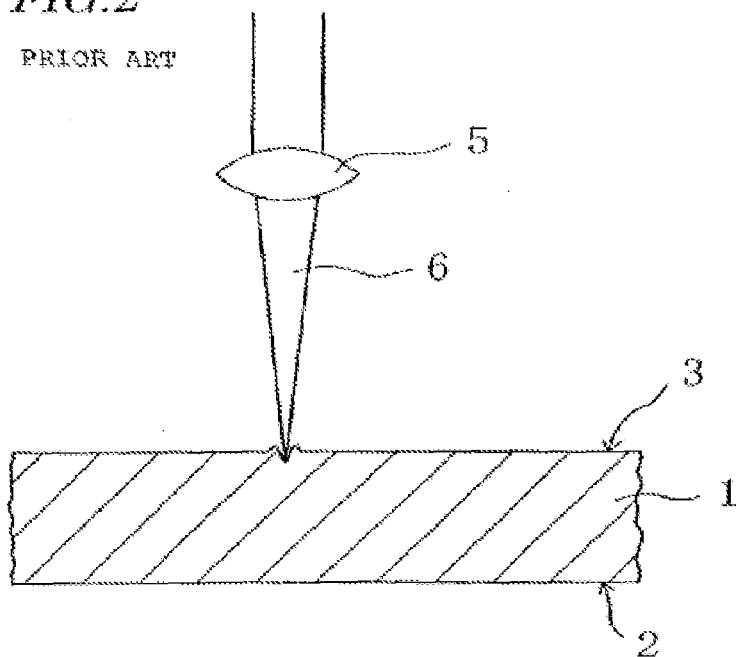
FIG. 2 schematically illustrates a conventional laser marking process.
Figure 3:
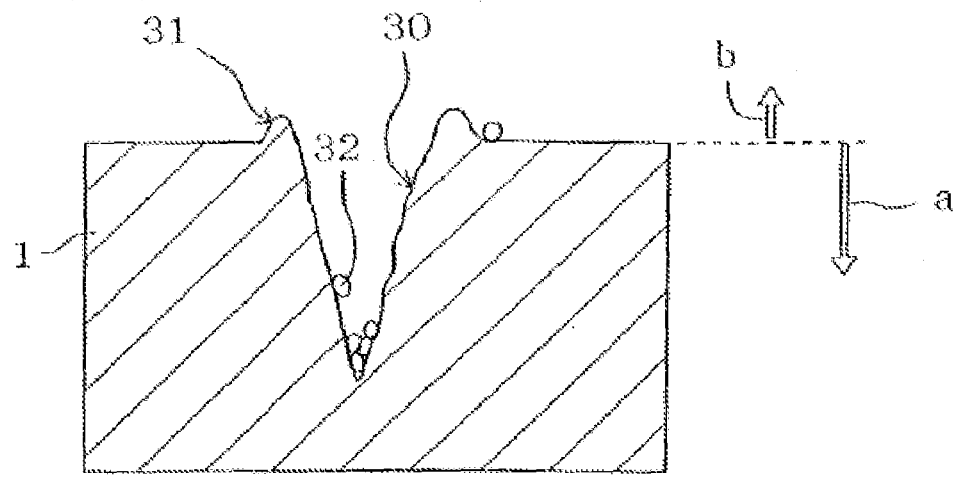
FIG. 3 is a cross-sectional view showing a deeply inscribed portion formed by a conventional laser marking process.

Then, various magnetic thin films are stacked on this thin-film magnetic head wafer. When the wafer obtained in this manner is divided into multiple bars 20 as shown in FIG. 1C, a number of identifiers 13 will be marked on each of those bars 20 as shown in FIG. 1B. Thereafter, each of those bars 20 is further divided into a number of magnetic heads, on each of which its own identifier 13 will be written as shown in FIG. 1A. In this manner, the respective magnetic heads are easily identifiable by their serial numbers. Thus, the magnetic head manufacturing process can be controlled as in the prior art.

The preferred embodiment of the present invention described above provides a method for manufacturing a magnetic head that can solve the contamination problem, normally caused by the laser marking process, and that can be effectively used for a sufficiently long time even in a storage medium drive that should be free from dust as completely as possible. As a result, not only the production yield of magnetic heads but also the reliability of magnetic recording/reproducing apparatus including such a magnetic head can be increased.

It should be noted that any arbitrary portion of the magnetic head may be marked with the ID information. That is to say, the present invention is in no way limited to the specific marking locations shown in FIG. 1B.

Storage Medium Drive

Figure 7:
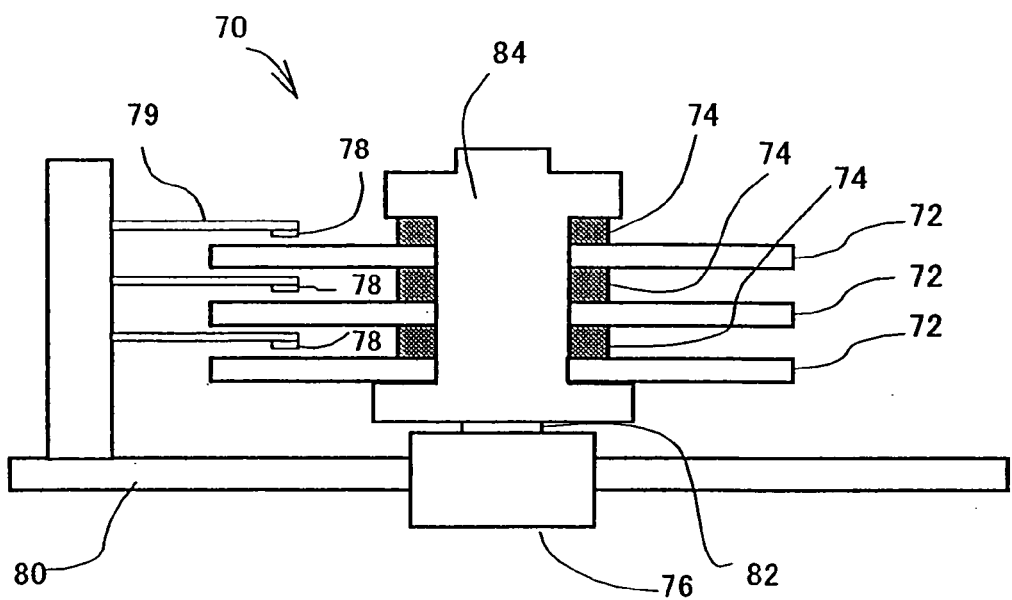
FIG. 7 is a cross-sectional view of a hard disk drive according to a preferred embodiment of the present invention.

FIG. 7 shows the cross-sectional structure of a storage medium drive (i.e., a hard disk drive) 70 including magnetic heads on which ID information is inscribed by the marking method according to the preferred embodiment of the present invention described above. As shown in FIG. 7, the hard disk drive 70 preferably includes three magnetic disks 72, each including a magnetic recording layer (not shown), media spacers 74 provided between the magnetic disks 72, an electric motor 76 for rotating the magnetic disks 72, and magnetic heads 78 for use to read and write information from/onto the magnetic disks 72 when brought close to the disks 72. The magnetic heads 78 are made by the method described above and each have inscribed ID information thereon. Each of these magnetic heads 78 is fixed to the end of its associated supporting member 79 and can gain access to any arbitrary track on its associated magnetic disk 72 rotating. Information can be read out from, or written on, the magnetic recording layer (not shown) of the magnetic disk 72 by an electrical/magnetic transducer (not shown) provided for the magnetic head 78. The electric motor 76 is secured to the chassis 80 of the hard disk drive 70. A rotating cylinder 84 is fitted with the rotating shaft 82 of the electric motor 76. The magnetic disks 72 rotate with the rotating cylinder 84.

EXAMPLES

Hereinafter, a specific example of a preferred embodiment of the present invention will be described. In this example, an $Al_2O_3$—TiC based ceramic wafer, made of a compound sintered body including about 66 wt % of $Al_2O_3$ and about 34 wt % of TiC, was used. This wafer was obtained by a machining process as a substantially rectangular (of about 50 mm square) thin wafer with a thickness of about 1.2 mm. Also, the surface of the wafer was finished by a mirror polishing process using diamond slurry (with a mean particle size of about 1 μm) so as to have a surface roughness Ra of about 0.5 nm to about 1.5 nm.

In this example, the back surface of the wafer was subjected to etching processes under various conditions, thereby marking ID information thereon. The marking process was carried out so as to inscribe a 7-digit symbol consisting of characters or numerals on each head portion of the wafer. The identifier does not have to be such a symbol but may also be a two-dimensional barcode. Approximately 3,000 identifiers (in approximately 21,000 characters) were inscribed on the back surface of a single wafer. The sizes of each of those symbols inscribed were about 100 μm by about 150 μm. The detailed conditions for the etching processes that were carried out for marking purposes are shown in the following Table 1:

TABLE 1

| Sample | System | Etching conditions |
| --- | --- | --- |
| 1 | ICP-RIE | A × 0 min. + B × 4 min. |
| 2 | ICP-RIE | A × 2 min. + B × 4 min. |
| 3 | ICP-RIE | A × 5 min. + B × 4 min. |
| 4 | ICP-RIE | A × 0 min. + B × 2 min. |
| 5 | ICP-RIE | A × 2 min. + B × 2 min. |
| 6 | ICP-RIE | A × 5 min. + B × 2 min. |
| 7 | Cnv. RIE | C × 0 min. + D × 12 min. |

TABLE 1-continued

| Sample | System | Etching conditions |
|---|---|---|
| 8 | Cnv. RIE | C × 4 min. + D × 12 min. |
| 9 | Cnv. RIE | C × 7.5 min. + D × 12 min. |

In the "system" column of Table 1, "ICP-RIE" stands for an inductively coupled plasma reactive ion etching system, which is a parallel plate plasma enhanced etching system including magnetic field generating coils. On the other hand, "Cnv. RIE" stands for a conventional reactive ion etching system, which is a parallel plate plasma enhanced etching system of the type applying no magnetic fields. In each of these etching systems, an RF power supply is connected to the electrode on a wafer holder and plasma of the etching gas is generated between the upper and lower electrodes. The ICP-RIE normally achieves a higher etch rate than the Cnv. RIE because the electron density in the plasma can be higher in the ICP-RIE system than in the Cnv. RIE system. However, if a selective etching process is simply carried out by using the ICP-RIE system, the etch rate of $Al_2O_3$ decreases significantly.

Also, in the "etching conditions" column of Table 1, the reference letters A, B, C and D denote the four sets of etching conditions shown in the following Table 2. For example, "A×2 min.+B×4 min." means that the etching process should be performed for about 2 minutes under the conditions A and for about 4 minutes under the conditions B. It should be noted that only the selective etching process was performed on the samples Nos. 1, 4 and 7, which represent comparative examples for the present invention.

TABLE 2

| Conditions | System | Power density (W/cm$^2$) | Pressure of CF$_4$ gas (10 × 10$^{-3}$ Torr) | Al$_2$O$_3$ rate (nm/min.) | TiC rate (nm/min.) |
|---|---|---|---|---|---|
| A | ICP-RIE | 1.75 | 4.0 | 30 | 30 |
| B | ICP-RIE | 0.8 | 2.0 | 5 | 25 |
| C | Cnv. RIE | 0.9 | 9.0 | 20 | 20 |
| D | Cnv. RIE | 0.18 | 20.0 | 0.5 | 10 |

In Table 2, the "power density" is the density of the power, supplied to the etching system, as measured per unit electrode area. In this example, $CF_4$ gas was used as an etching gas. Also, in Table 2, the "$Al_2O_3$ rate" denotes the etch rate of the $Al_2O_3$ particles while the "TiC rate" denotes the etch rate of the TiC particles.

As can be seen from Table 2, according to the two sets of conditions A and C, the etch rate of $Al_2O_3$ was approximately equal to that of TiC, thus realizing a non-selective etching process. Thus, under each of these two sets of etching conditions, the ion-induced physical etching action was dominating. On the other hand, according to the other two sets of conditions B and D, the etch rate of TiC was much higher than that of $Al_2O_3$, thus realizing a selective etching action in such a manner as to etch TiC faster and earlier than $Al_2O_3$. Accordingly, under each of these two sets of conditions, the radical-species-induced chemical etching action was dominating.

As shown in Table 1, each of the samples Nos. 1, 2 and 3 was subjected to the selective etching process under the conditions B for approximately 4 minutes. However, these samples Nos. 1, 2 and 3 were subjected to the non-selective etching process under the conditions A for 0, 2 and 5 minutes, respectively. On the other hand, each of the samples Nos. 4, 5 and 6 was subjected to the selective etching process under the conditions B for approximately 2 minutes. However, these samples Nos. 4, 5 and 6 were subjected to the non-selective etching process under the conditions A for 0, 2 and 5 minutes, respectively. That is to say, the selective etching process under the conditions B was carried out on the two groups of samples Nos. 1, 2 and 3 and Nos. 4, 5 and 6 for mutually different amounts of time.

As for samples Nos. 1 to 9, on which the ID information was inscribed under the various conditions shown in Table 2, the depths t1 and t2 of the first and second concave regions defined, the variation ΔR in reflectance, and the readability were estimated. The results are shown in the following Table 3:

TABLE 3

| Sample | Depth t1 (nm) of first Concave region | Depth t2 (nm) of second concave region | Variation Δ R (%) in reflectance | Readability (%) |
|---|---|---|---|---|
| 1 | 5 | 90 | 62.0 | 95.5 |
| 2 | 80 | 90 | 62.6 | 99.5 |
| 3 | 155 | 90 | 62.0 | 99.5 |
| 4 | 5 | 45 | 23.1 | 0 |
| 5 | 80 | 45 | 23.9 | 0 |
| 6 | 155 | 45 | 24.5 | 12.5 |
| 7 | 5 | 120 | 63.4 | 96.5 |
| 8 | 80 | 120 | 61.6 | 99.5 |
| 9 | 155 | 120 | 64.0 | 99.5 |

In Table 3, the variation ΔR in reflectance (which is given by (R2−R1)/R2) was obtained with respect to light having a wavelength of about 546 nm. The greater this variation ΔR in reflectance, the greater the difference between the reflectance R2 of the non-etched surface and the reflectance R1 of the etched surface would be. The readability was measured with a reader that used the light having a wavelength of about 546 nm as its illumination. Alternatively, white light or any other visible radiation may also be used as the illumination. Also, acuReader produced by Komatsu Ltd. may be used as the reader.

As can be seen from the results shown in Table 3, the non-selective etching process was not carried out on the samples Nos. 1, 4 and 7 representing comparative examples. Thus, in the samples Nos. 1, 4 and 7, the first concave region had a depth t1 of about 5 nm, which is much smaller than 20 nm, and substantially no first concave region was defined. It should be noted that even when the first concave region has a depth t1 of less than about 20 nm, a variation in reflectance as high as more than 60% can be obtained as in the sample No. 1 by performing the selective etching process sufficiently. However, even if the variation in reflectance exceeds 60% but if the first concave region has a depth t1 of only 5 nm, the resultant readability is just about 95.5% as in the sample No. 1.

The present inventors discovered and confirmed via experiments that to achieve a readability as high as about 97% or more, the first concave region needs to have a depth t1 of at least about 10 nm. Meanwhile, even if the first concave region defined has a depth t1 of about 80 nm or more but if the selective etching process is carried out insufficiently, the variation in reflectance is less than about 35% and the readability was zero or at most quite low as in the samples Nos. 4, 5 and 6.

In view of these considerations, to make the ID information inscribed accurately readable, a variation ΔR in reflectance of at least about 25% should be achieved by providing the second concave region, and the non-selective etching process should be carried out such that the first concave region has a depth of at least about 10 nm.

Figure 8:
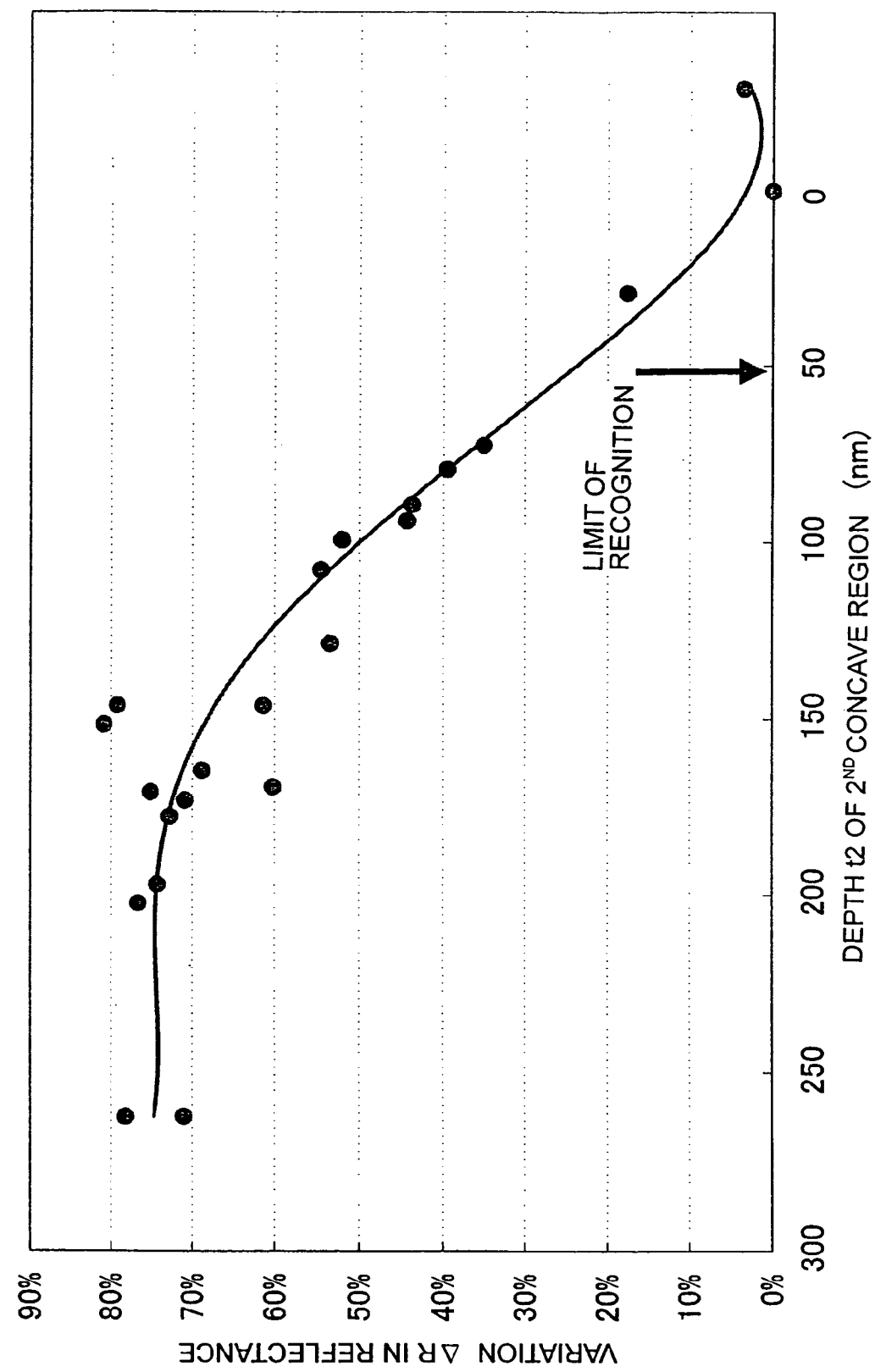
FIG. 8 is a graph showing a relationship between the variation ΔR in reflectance as a result of a selective etching process and the depth t2 of a second concave region.

FIG. 8 is a graph showing a relationship between the variation ΔR in reflectance as a result of the selective etching process and the depth t2 of the second concave region. In FIG. 8, the ordinate represents the variation ΔR in reflectance, while the abscissa represents the depth t2 of the second concave region, which increases leftward. The ID information inscribed is readable when the variation ΔR in reflectance is at least about 25%.

Figure 9:
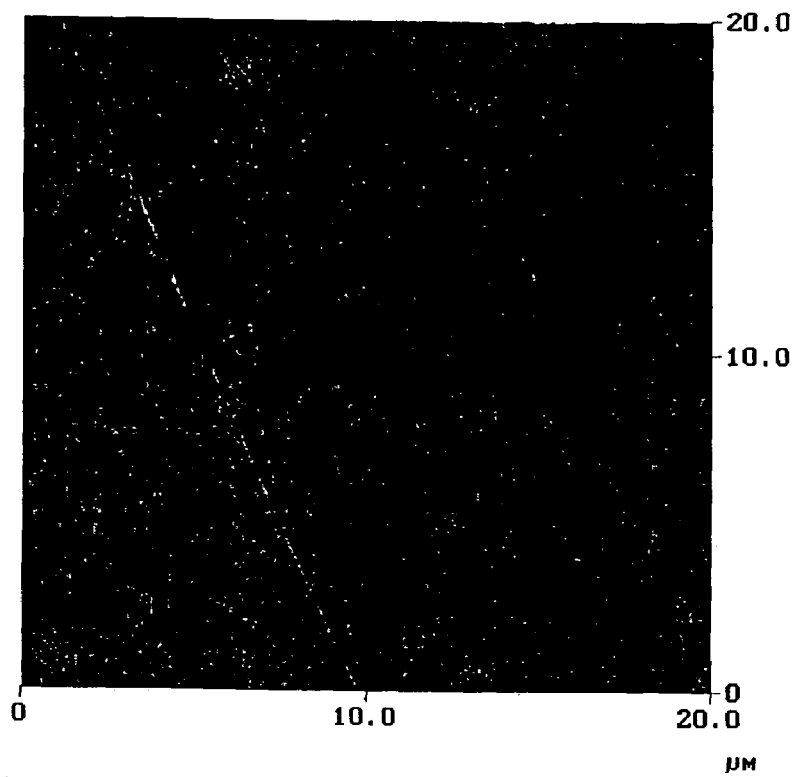
FIG. 9 is an AFM photograph showing the non-etched surface of a sintered body in a specific example of a preferred embodiment of the present invention.
Figure 10:
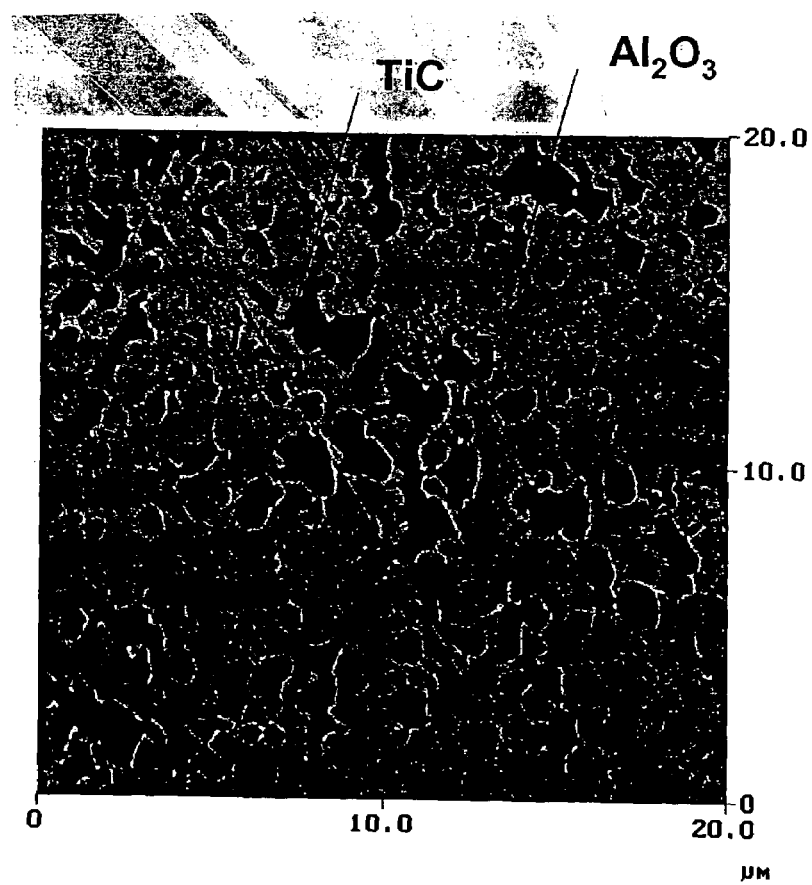
FIG. 10 is an AFM photograph showing the etched surface of a sintered body in a specific example of a preferred embodiment of the present invention.

FIG. 9 is an AFM photograph of the non-etched surface of a wafer, while FIG. 10 is an AFM photograph of the etched surface of the wafer.

A marking method according to any of various preferred embodiments of the present invention described above achieves a reflected light contrast that is high enough to make the ID information inscribed accurately recognizable. In addition, the concave portion defining the ID information can have a sharpened profile, thus further increasing the readability (i.e., the recognition rate) of the ID information. In particular, even after the wafer has been subjected to a polishing process, the unwanted decrease in readability is avoidable.

Also, according to preferred embodiments of the present invention, a magnetic head completed as a product generates a much smaller amount of dust, thus increasing the reliability of a storage medium drive.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A sintered body comprising a sintered mixture of a first type of powder particles and a second type of powder particles, wherein the first type of powder particles is made of a first material, and the second type of powder particles is made of a second material that has a different etch susceptibility from the first material; and
   wherein a first concave region is defined to a depth of at least about 10 nm under the surface of the sintered body and a second concave region is defined under the first concave region, respectively, and identification information is provided on the surface of the sintered body, the first concave region being defined by an etched portion of the first and second types of powder particles, the second concave region being defined by an etched portion of only the first type of powder particles.

2. The sintered body of claim 1, wherein the second concave region has a depth of at least about 50 nm as measured from the bottom of the first concave region.

3. The sintered body of claim 2, wherein the second concave region has a depth of at most about 5 µm as measured from the bottom of the first concave region.

4. The sintered body of claim 1, wherein the first and second types of powder particles both have a mean particle size of about 0.3 µm to about 5.0 µm.

5. The sintered body of claim 1, wherein a variation ΔR in reflectance due to an etching process is at least about 25% with respect to light having a particular wavelength, the variation ΔR being determined by (R2−R1)/R2, where R1 is the reflectance of a portion of the surface of the sintered body that has been subjected to an etching process and R2 is the reflectance of another portion of the surface of the sintered body that has not been subjected to an etching process.

6. The sintered body of claim 5, wherein the particular wavelength is included in the wavelength range of light to be radiated toward the sintered body to read the identification information optically.

7. The sintered body of claim 1, wherein a portion of the surface of the sintered body, which has not been subjected to an etching process, has a surface roughness of at most about 5 nm.

8. The sintered body of claim 1, wherein the first and second materials are compounds selected from the group consisting of aluminum oxide, aluminum nitride, silicon oxide, silicon nitride, zirconium oxide, zirconium nitride, silicon carbide, titanium carbide, titanium oxide and iron oxide.

9. A wafer for magnetic heads, the wafer comprising:
   a sintered body; and
   an insulating film provided on the sintered body;
   wherein the sintered body includes a sintered mixture of a first type of powder particles and a second type of powder particles, the first type of powder particles being made of a first material, the second type of powder particles being made of a second material that has a different etch susceptibility from the first material, and
   wherein a first concave region is defined to a depth of at least about 10 nm under the surface of the sintered body and a second concave region is defined under the first concave region, respectively, and identification information is provided on the surface of the sintered body, the first concave region being defined by an etched portion of both the first and second types of powder particles, the second concave region being defined by an etched portion of only the first type of powder particles.

10. A magnetic head comprising:
    a substrate; and
    an electrical/magnetic transducer provided on the substrate;
    wherein the substrate is made of a mixture of a first type of powder particles and a second type of powder particles, the first type of powder particles being made of a first material, the second type of powder particles being made of a second material that has a different etch susceptibility from the first material; and
    wherein a first concave region is defined to a depth of at least about 10 nm under the surface of the substrate and a second concave region is defined under the first concave region, respectively, and identification information is provided on the surface of the substrate, the first concave region being defined by an etched portion of both the first and second types of powder particles, the second concave region being defined by an etched portion of only the first type of powder particles.

11. A storage medium drive comprising:
    a magnetic head, which includes a substrate and an electrical/magnetic transducer provided on the substrate;
    a storage medium with a magnetic recording film from and on which information is read or written by the magnetic head; and
    a motor to drive the storage medium;
    wherein the substrate is made of a mixture of a first type of powder particles and a second type of powder particles, the first type of powder particles being made of a first material, the second type of powder particles being made of a second material that has a different etch susceptibility from the first material; and wherein a first concave region is defined to a depth of at least about 10 nm under the surface of the substrate and a second concave region is defined under the first concave region, respectively, and identification information is provided on the surface of the substrate, the first concave region being defined by an etched portion of both the first and second types of powder particles, the second concave region being defined by an etched portion of only the first type of powder particles.

* * * * *